Patented Oct. 20, 1925.

1,558,336

UNITED STATES PATENT OFFICE.

JÉAN HENRY BRÉGEAT, OF PARIS, FRANCE.

PROCESS OF ABSORBING VAPORS.

No Drawing.  Application filed April 12, 1924.  Serial No. 706,187.

*To all whom it may concern:*

Be it known that I, JÉAN H. BRÉGEAT, a citizen of the Republic of France, residing at Paris, Department of the Seine, France, have invented certain new and useful Improvements in Processes of Absorbing Vapors, of which the following is a specification.

In my French Patent No. 554,327 of July 21, 1922, and in the corresponding U. S. Patent 1,513,153, I have described and claimed a process of absorbing vapors of organic substances from gas mixtures containing the same by the use of an absorbent menstruum containing hydrogenated naphthalene.

The present invention constitutes an improvement on said process, in which instead of hydrogenated naphthalene, there is used the hydrogenated derivatives of phenols. As examples of such derivatives, mention is made of hexahydrophenol, or cyclohexanol (commercially known as hexaline) or hexahydrocresol (commercially known as methyl hexaline) but it is to be understood that the invention is not restricted to the use of these specific substances, since various other hydrogenated phenol bodies can be employed. The hydrogenated phenols are in some respects better absorbents than the hydrogenated naphthalenes.

As in my U. S. patent above identified, the hydrogenated compound selected can be used alone or in admixture with other absorbing media, such as tar oils, paraffin oils, cresols, cresylic acid or other oily liquids.

The general mode of procedure for use in the present invention is shown in my prior U. S. Patents 1,315,700, and 1,455,707, and apparatus suitable for use in the present process is that covered in my U. S. Patent 1,315,701, although it will be understood that the present invention is not limited to the details shown in my prior patent above mentioned.

The hydrogenated derivatives of phenols are soluble in all proportions in paraffin oils, tar oils, carbolic acid, cresol (singly or mixed) and other like liquids. The absorbed volatile substances can be separated from the absorbing liquid after use, by fractional distillation, for example, as shown in my prior patents above referred to, and the absorbing agents are thereby regenerated for reuse in the process, whereby the recovery of the volatile materials in continuous operation is made possible.

I claim:

In the absorption and removal of vapors from gas-vapor mixtures, the herein described improvement which comprises subjecting such gas-vapor mixtures to the absorbing action of an absorbent liquid comprising a hydrogenated phenolic body.

In testimony whereof I affix my signature.

JÉAN HENRY BRÉGEAT.